United States Patent Office 3,447,990
Patented June 3, 1969

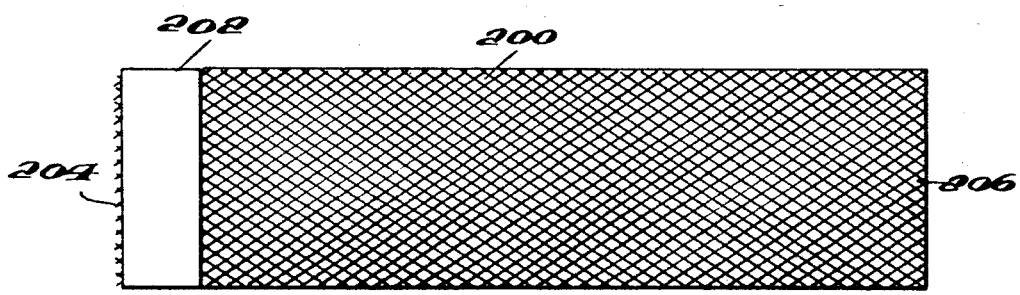
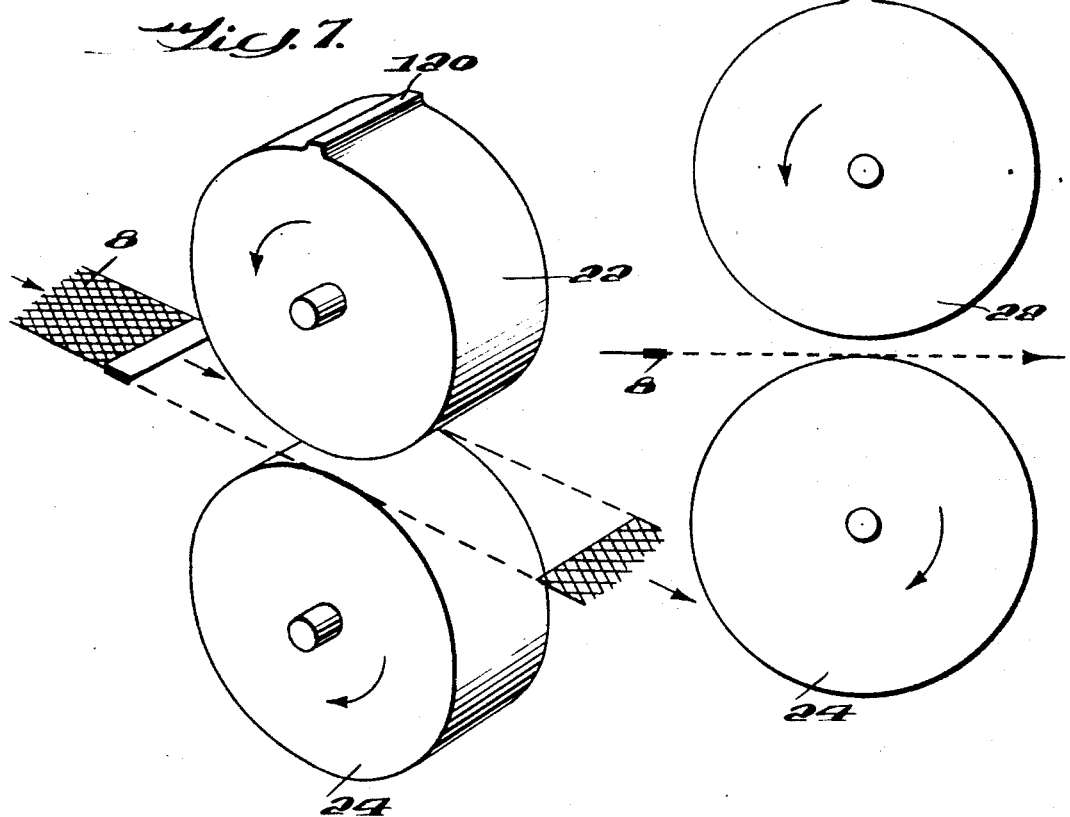

3,447,990
METHOD FOR MAKING BAGS FROM TUBULAR NETTING
Robert E. Fogg, Lynn, Mass., assignor to E. I. du Pont de Nemours and Company, Wilmington, Del., a corporation of Delaware
Filed June 30, 1964, Ser. No. 379,313
Int. Cl. B65b *43/02;* B32b *31/18*
U.S. Cl. 156—269         1 Claim

ABSTRACT OF THE DISCLOSURE

An improved method for fabricating labeled open-ended bags which comprises feeding a tubular web in a continuous flattened band, applying labels to the web, essentially simultaneously forming transversely weakened lanes across the web by the co-action of a flat bar and a transversely serrated land, each located on a rotatable nip roll, and separating the bag sections at the weakened lanes.

---

This invention relates to bags, and more particularly to process and apparatus for continuously producing indexed bag lengths from unsupported, non-rigid, tubular net-like or similar structures.

Unsupported, non-rigid, tubular net-like and similar structures are difficult to handle, and especially difficult to maintain in a smooth, natural tension, flat form for continuous, multiple-phase processing. Conventional bag making machines and processes for handling supported, rigid, and/or continuous solid structures will stretch, buckle up, or otherwise distort the materials processed in this invention, thus rendering such conventional means ineffective to produce the desired indexed length bags with precise reproducibility.

This invention has an object to continuously produce indexed bag lengths from unsupported, non-rigid, tubular net-like or similar structures. A further object is to provide apparatus for maintaining unsupported, non-rigid, tubular net-like or similar structures in smooth, natural tension, flat form for continuous, multi-phase processing. A still further object is to provide process and apparatus for producing accurate length bags, closed at one end, with precise reproducibility. Other objects will appear hereinafter.

The bag product is expected to be filled through the open bottom and the bottom subsequently closed, as by tying or sewing.

The objects of this invention are accomplished in a process for fabricating labeled, open-ended bags from tubular thermoplastic netting material comprising spreading and feeding the tubular netting material in a continuous flattened band, applying labels to the tubular netting material, forming transverse weakened lanes across the netting and separating the bag sections at the weakened lanes, by the improvement comprising the essentially simultaneous application of labels and formation of the transverse weakened lanes by:

(a) Applying two adhesively sealable labels to the external surfaces of the flattened netting at predetermined intervals, (b) Adhering one of said labels to the other of said labels through the open netlike structure of the flattened netting by pressing them together, and (c) Forming a transversely weakened section across the netting substantially adjacent to said labels.

The apparatus of this invention is in a bag making apparatus comprising means for feeding continuous length, flattened, tubular material, means for intermittently engaging the tubular material to effect transverse weakened lanes, means for applying labels to the tubular material and means for separating bag sections at the weakened lanes, with the improvement comprising means for essentially simultaneously effecting transverse weakened lanes and applying labels to the tubular material comprising:

(a) A first and a second rotatable roll, co-acting in a nip-forming relationship, (b) A flat bar extending lengthwise on the surface of said first roll, (c) A transversely serrated land extending lengthwise on the surface of said second roll, located such that said flat bar and said serrated land cooperatively engage one another when said first roll and said second roll are rotated.

(d) Label positioning areas on the surface of said first and said second rolls located substantially adjacent to said flat bar and said serrated land, and (e) Means to drive said first roll and said second roll in synchronism.

Apparatus for carrying out the method according to this invention is shown by way of example in the attached drawings in which—

FIG. 6 is a view of a bag produced by the apparatus of this invention;

FIG. 7 is a perspective view of the web separating rolls of FIG. 1; and

FIG. 8 is a side elevation of the web separating rolls shown in FIG. 7.

It should be recognized that, while normally a bag-making machine, the primary element of the apparatus of this invention is to always give a web or net with weakened lanes at exact predetermined intervals. To accomplish this, the web weakening rolls are on a given predetermined time cycle for any given web lineal velocity, and the drives for the web weakening rolls have identical, matched rotational and dwell images and are synchronized and interlocked to provide the correct predetermined bag length.

Figure 1:
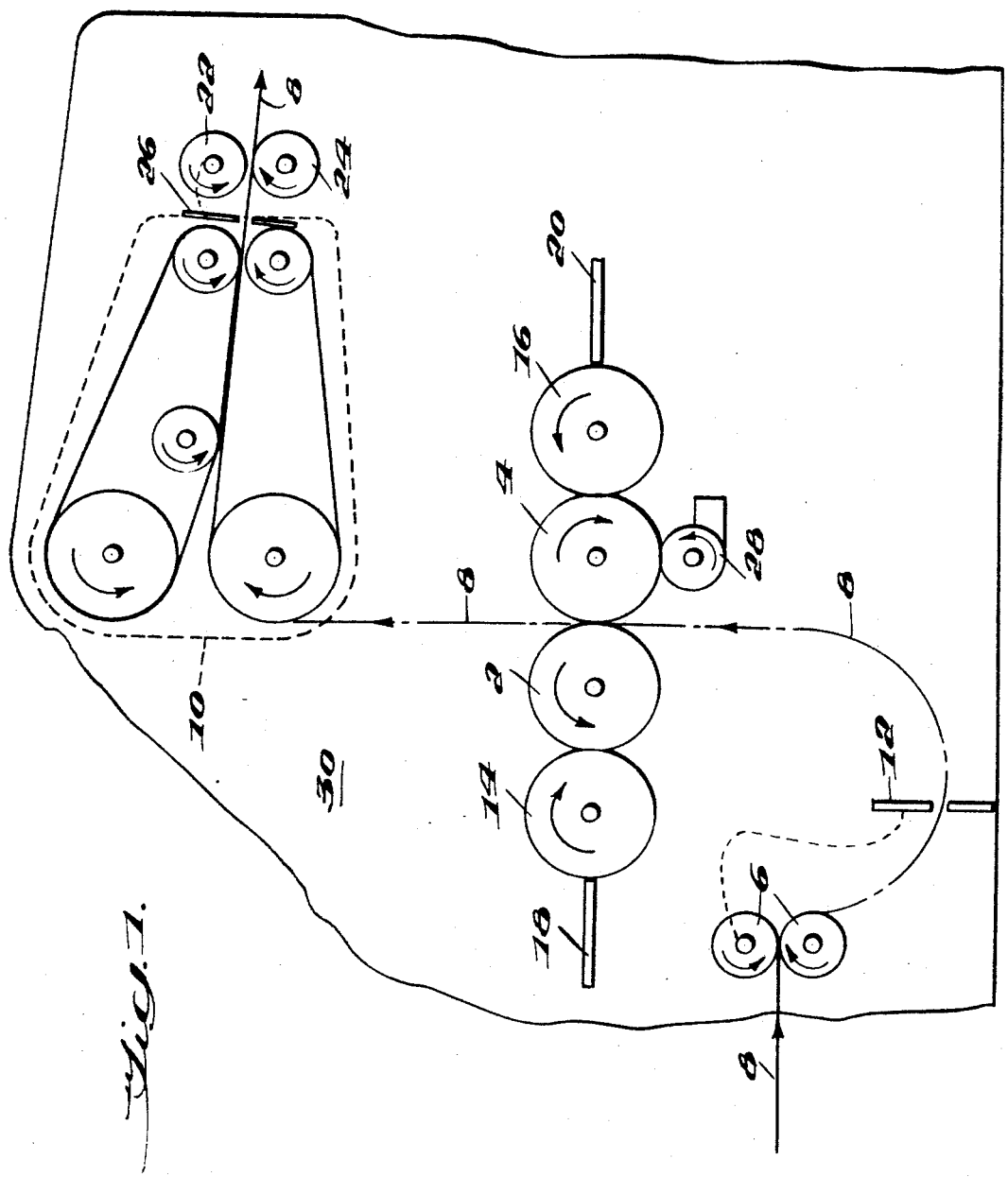
FIG. 1 shows a diagrammatic side elevation of a preferred form of apparatus for carrying out the present invention.

Referring in more detail to the accompanying FIG. 1, the means for supplying an essentially constant feed rate to the web weakening rolls 2 and 4 is provided by a set of nip rolls 6 drawing the net, or web, 8 from its given source. The feed nip rolls 6 are controlled by a variable-speed drive synchronized with an endless belt take-off drive, as illustrated at 10, mounted on supporting frame 30.

As the net 8 is often in a rope-like condition, the feed nip rolls 6 normally pull the net 8 from a source, e.g., an unwind roll and through a spreader. Slippage of the net 8 occurs through the feed nip rolls 6. If the slippage continued, and the take-off drive at 10 was driven at the same speed as the feed nip rolls 6, a high tension and stretch on the net 8 would result. However, the feed nip roll variable-speed drive mechanism, activated by a sensing device 12, controls the amount of net 8 drawn between the web weakening rolls 2 and 4 by the take-off endless belt drives at 10. The variable-speed drive may be overdriven or underdriven a given ratio at any given feed speed by activation from the sensing device 12, in turn activated by excess slack or tension in net 8. The sensing device, as will be obvious to those skilled in the art, can be a photoelectric cell such as Clairex types 50–90, or a micro-switching relay unit, Acro type BRD–2, both commercially available through Allied Radio Company, Chicago, Ill. While the take-off and the nip roll feed drives are synchronized at the same speeds, as the speeds increase or decrease, the set ratio for overdriving or underdriving the feed nip rolls 6 remains constant. As a result, the nip roll feed provides sufficiently untensioned net 8. The flat, unsupported, non-rigid net 8, in an essentially at rest condition (i.e., tension by its own weight), in this case is drawn vertically upward through a pair of co-acting co-current web weakening rolls 2 and 4 (rolls to be described further), mounted on supporting frame 30, such that as the roll surfaces pass together, the net 8 is compressed slightly and labels 18 and 20 from each of the pair of web weakening rolls 2 and 4 are applied on opposing sides. The web weakening rolls 2 and 4 with associated labeling applications have a predetermined speed or a cycling predetermined by the length of net 8 desired for each bag (FIG. 6 illustrates a typical finished bag 200 as produced by this apparatus). A cam unit determines moving and dwell cycles of the web weakening rolls 2 and 4. The cam unit provides identical, matched rotational and dwell images. Cam units well known in the art can be adapted for use with this apparatus. The dwell cycle determines the length of net 8 being pulled between the web weakening rolls 2 and 4 at a constant speed by the endless belt take-off drive mechanism 10. The moving cycle of the web weakening rolls 2 and 4 controls the label application and the transverse weakening of the net strands.

Figure 3:
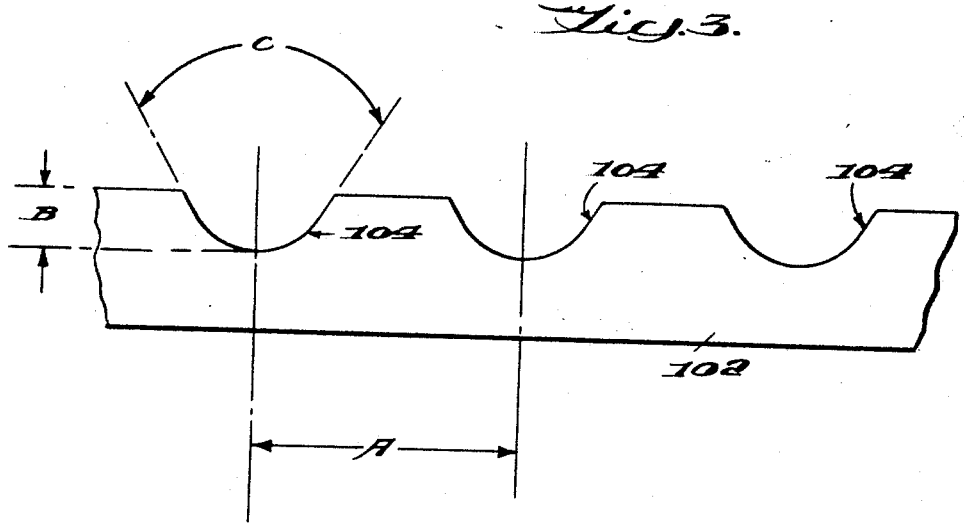
FIG. 3 is an enlarged view of the serrated land.
Figure 4:
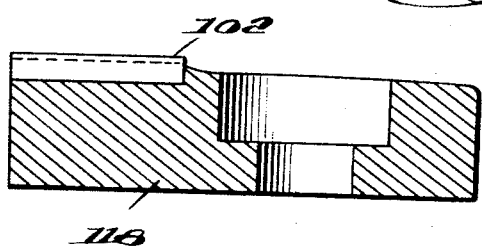
FIG. 4 is a cross-sectional view of a replaceable insert of one of the peripheral surfaces having a serrated land.
Figure 5:
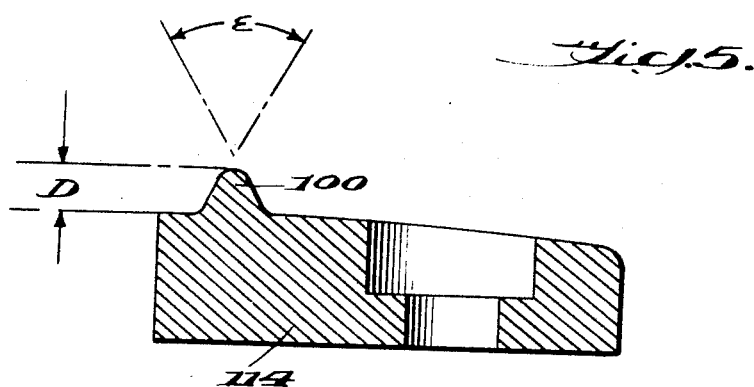
FIG. 5 is a cross-sectional view of a replaceable insert of one of the peripheral surfaces having a web crushing bar.

While passing between the web weakening rolls 2 and 4 the net 8 immediately preceding the head of the labels 18 and 20 is weakened by a bar 100 (FIGS. 2 and 5) of one of the web weakening rolls 2 against a serrated land 102 (FIGS. 2, 3 and 4) of the other web weakening roll 4. The serrated land 102 extends across the web weakening roll 4 and is parallel to web weakening bar 100 of web crushing roll 2. The serrations 104 (see FIG. 3) themselves are circumferential and perpendicular to the axis of roll 4 and transverse to the web crushing bar 100. Strands of net 8 are crushed (deformed and squeezed) into the serrations 104 resulting in multiple, tiny fibrous strands. The bridging action of the bar 100 against the serrated land 102 should be minimized to prevent complete cut-off. The transverse crushing weakens the net 8 so that it can later be easily separated at the transversely crushed portions. The plasticity and deformability of thermoplastic material helps prevent cutoff during the crushing action.

Shown in FIG. 1 is the preferred embodiment of applying labels 18 and 20 to opposite sides of the net 8 as it passes through the web weakening rolls 2 and 4. The label applications are simultaneous and synchronized with the transverse crushing operations. The labels 18 and 20 are applied by transfer from vacuum transfer rolls 14 and 16 to vacuum label application areas 108 and 110 of the web weakening rolls 2 and 4, and then from the label application areas 108 and 110 to the opposite sides of net 8. The labels 18 and 20 may be supplied to the vacuum transfer rolls 14 and 16 by any number of commercially available means. The label cutting-transfer means provides precision cut labels 18 and 20 and is based on conventional established principles. Only one label 20 is required to have adhesive, which is applied to the label by adhesive applicator roll 28. The adhesive used in the apparatus shown is a hot-melt adhesive similar to those used in the book-binding trade. The label 20 with adhesive strikes the net 8 and the other label 18. The vacuum label application areas 108 and 110 of web weakening rolls 2 and 4 have vacuum ports 106 which hold the labels 18 and 20 in register for their subsequent application. This vacuum draw also exerts a cooling action through the facing-aligned peripheral surfaces (shown in FIG. 2) of the web weakening rolls 2 and 4. The rotatable label vacuum transfer rolls 14 and 16 are mounted on the supporting frame 30 in axially parallel spaced relationship to each other and to the web weakening rolls 2 and 4 (see FIG. 1). These transfer rolls 14 and 16 have a plurality of facing-aligned discontinuous arcuate peripheral surfaces, the arcuate surfaces of one of each of the transfer rolls 14 and 16 being in communicating relationship with the arcuate peripheral surfaces of one of each of the web weakening rolls 2 and 4. The arcuate surfaces of the transfer rolls 14 and 16 also have label positioning areas with vacuum apertures spaced therein to position the labels 18 and 20 for transfer to the label positioning areas 108 and 110 of web weakening rolls 2 and 4. All label positioning areas have conventional means for applying vacuum to the vacuum ports. The vacuum applied within the web weakening rolls 2 and 4 will generally be greater than that in the transfer rolls 14 and 16.

Figure 2:
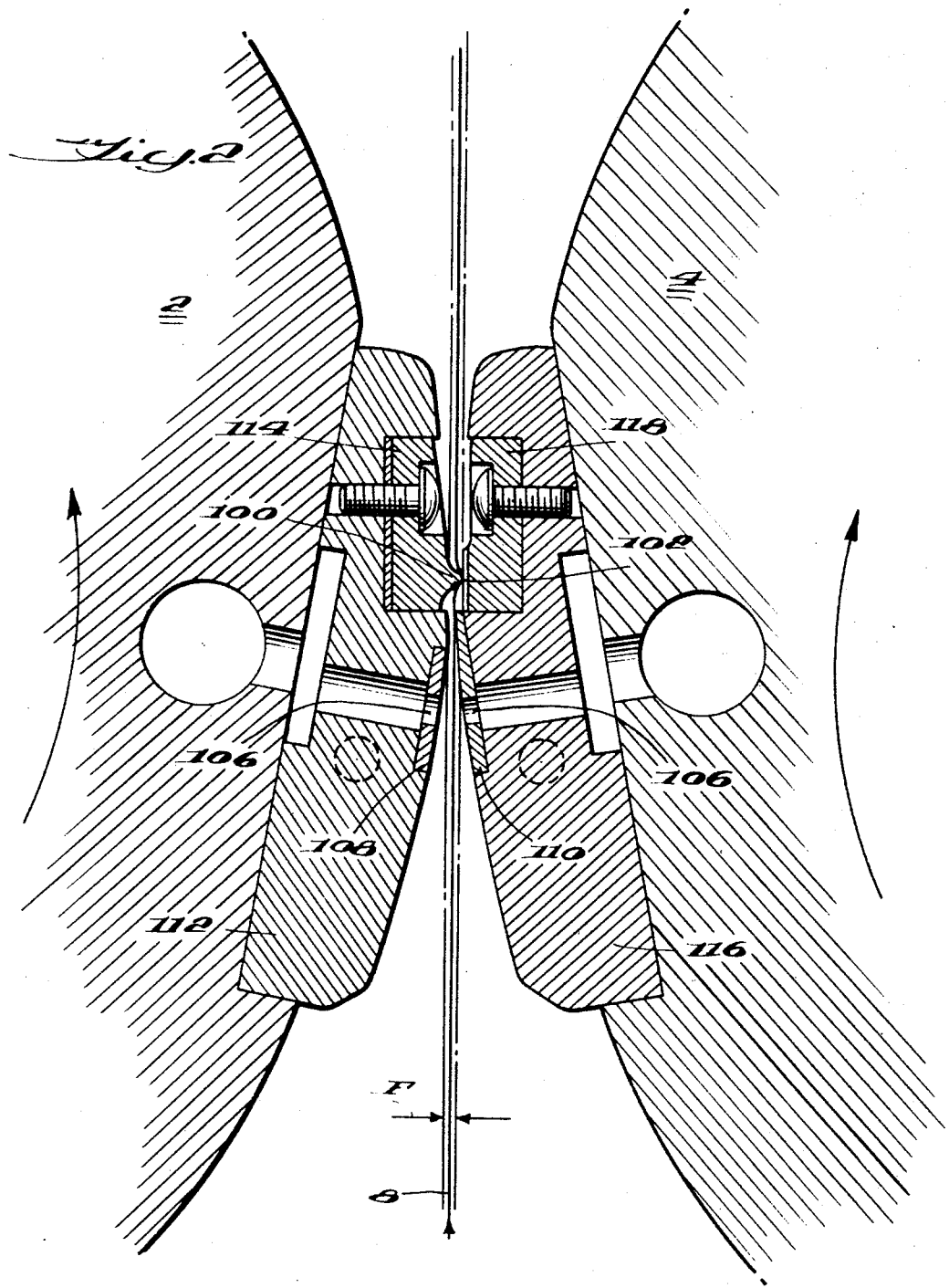
FIG. 2 is a cross-sectional view of opposed facing-aligned discontinuous peripheral surfaces of the web weakening rolls.

The velocity of web weakening rolls 2 and 4, when preset to transversely crush at maximum bag length, is matched to the lineal net velocity of the web 8 being drawn through the machine. When transversely crushing at less than the maximum bag length design, the web weakening rolls 2 and 4 momentarily overdrive the net 8. However, during the dwell cycle of the web weakening rolls 2 and 4, there is a slight gap between the rolls providing a free plane for passage of the net 8, and the net 8 drops down, by gravity, to the rest position. Then that section of the net 8 regains its pre-set lineal velocity predetermined by the endless belt take-off means 10. The take-off belts at 10 not only provide constant desired take-off speed, but provide uniform pressure transversely across the net web 8 and provide a tension isolation between the transverse crushing and web separating operations. In the set of bursting rolls 22 and 24 following the take-off means 10, one roll 24 is continuously driven at a higher velocity than the web speed, in continuous contact with said web 8, and the other roll 22 at the same higher velocity having an offset raised portion 120 (see FIGS. 7 and 8) that only contacts the web 8 and lower web separating roll 24 when activated by a sensing device 26. The sensing device 26 indicates that the labels, 18 and 20, are at a given point and thus that the transversely crushed portion (end of bag) is at the right position. The upper web separating roll 22 is then activated at the higher velocity and grips and snaps the web, thus separating the weakened tiny fibrous strands at the transversely crushed portion of the web. The separated section forms the bottom 206 (see FIG. 6) of one bag 200 and the top 204 adjacent to the header label 202 of the next bag to be formed. Individual bags 200, sealed and labeled at one end, are now on hand for the first time. Through all the operations prior to this time, the net 8 has been a continuous length web. As seen in FIGS. 2 and 6, since the transverse crushing is done adjacent to the label application, the header label 202 is essentially at the end 204 of the finished bag 200.

The facing of the opposed discontinuous arcuate surfaces of index-crush rolls 2 and 4, as shown in FIG. 2, may be replaceable inserts 112 and 116 to facilitate, when necessary, the change of the web crushing bar 100, the serrated land 102 or the vacuum label positioning areas 108 and 110. Also, 108, 110, 114 and 118 may be replaceable inserts within inserts 112 and 116 so that the label positioning areas 108 and 110, the web crushing bar 100 or the serrated land 102 may be individually removed without removing the entire arcuate surface.

With respect to the web separating rolls 2 and 4, the discontinuous arcuate peripheral surfaces usually have a given clearance, F (see FIG. 2), that will exert a pressure sufficient to hold the net structure for the operation but insufficient to deform the net structure needlessly. The web crushing bar 100 and serrated land 102 usefully has an interference, readily determined with respect to the desired degree of compression, deformation, etc., for reducing the normal net strands to the desired crushed level.

Variations in the spacing A, depth B and contour C of the serrations 104, and in the depth D and contour E of the crush bar 100, have illustrated the ability to accurately vary the number of tiny strands or similar serrations and the resultant net strength at the transversely crushed portion. An appropriate rotogravure type roll surface could also adequately serve as the serrated land. Alternatively, the web crushing bar could have a serrated edge for use against a smooth land.

A multiplicity of variations in both the web crushing bar 100 and serrated lands 102 can be readily visualized to accomplish the transverse crushing to achieve any desired degree of severance as exemplified by the amount of tension required to separate the net structure, i.e., with respect to the serrated land, the greater the pitch (or spacing) A, the weaker the net; the greater the depth B, the stronger the net.

The net material, net configuration, and strand size together with the resultant desired transversely crushed net strength dictate the web crushing bar 100 and land 102 precise dimensioning.

Various web structures can be transversely crushed in accordance with the present invention and in no way should be limited to net structures. Polyolefin and other thermoplastic films, polyimide films, paper, regenerated cellulose films, polyester films and in general any web not brittle when struck with the given interference required for crushing may be used. Web structures exhibiting some degree of deformability can be readily processed.

It is obvious that pressure-sensitive labels, as well as adhesively sealable labels, could be applicable for some end uses. Further, any number of conventional label applying mechanisms could supply the labels 18 and 20 to the label transfer rolls 14 and 16.

It should be recognized that all drive units are synchronized for (1) constant bag length at constant take-off speed, (2) increased bag length at constant take-off speed, (3) decreased bag length at constant take-off speed, (4) increased bag length at increased take-off speed, (5) decreased bag length at increased take-off speed and (6) the other obvious combinations that are possible such that constant bag index length is maintained during increased acceleration and/or velocity and during deceleration and/or decreased velocity.

The take-off means 10 provides tension isolation from the web separating rolls 22 and 24 immediately following it. In the apparatus, the activation of the web separating rolls 22 and 24 may be accomplished by various methods, e.g., a photoelectric cell or a microswitching relay unit.

Sensing device 26 should be arranged as to activate web separating rolls 22 and 24 when the labels 18 and 20 activate the sensing device, i.e., interrupt the photoelectric beam or touch the microswitch.

In general, bag length produced by this machine ranges from 16 to 25 inches. These lengths can be held to very accurate measurements. The machine may run at a speed of 225 feet per minute to produce about 166, 16¼-inch bags per minute to 109, 24¾-inch bags per minute, though not specifically limited thereto. With respect to the web weakening rolls 2 and 4, the velocity of these rolls should match the bag net velocity at the maximum bag length desired. Mismatched velocities can be tolerated if the web weakening rolls 2 and 4 are operated at high velocities. Otherwise, if lower velocities are use by the web weakening rolls 2 and 4, a mechanism between these rolls and the take-off drives 10 must provide for some means to increase and decrease the length of net 8 with proper re-registration. The frequency of movement of the web weakening rolls 2 and 4 depends upon the distance between the plurality of discontinuous arcuate peripheral surfaces of these rolls as well as the length of bag desired. The controlling factor for producing varying bag lengths is the cam unit. If bag lengths, other than the range of those indicated in the table that follows are desired, it would be advisable to change cam assemblies.

Other means of operation are permissible, but would probably require additional mechanical means to insure constant speed of the net travel for proper indexing.

This apparatus could additionally be modified to apply to so-called "double label," i.e., transversely crushed through the middle of the label to provide two label ends of two lengths simultaneously and on the next index cycle the two bottom ends of two lengths could be transversely crushed. In this manner two heads, with labels and then two tails could be crushed. Since the label transfer rolls 14 and 16 and the web weakening rolls 2 and 4 have identical, matched rotational and dwell images, this modification could be accomplished with changes in the given interferences of each index-crush station and the vacuum label application areas.

Of course, for some purposes it may be advantageous not to separate the netting into lengths immediately. The transversely crushed net, with or without labels may then be wound into rolls or festooned in boxes preparatory to subsequent use.

The following table gives typical settings and dimensions for making 16¼-inch and 24¾-inch length bags from continuous lengths, lay flat, plastic netting with the present apparatus when operating at a speed of 225 feet/minute. Some practical operating ranges possible with the present apparatus are also given.

TABLE

| | |
|---|---|
| Bag width range | About 1" to 6¾". |
| Feed roll range | 10 to 300 feet/minute, with ± 5% variation from given take-off speed. |
| Label transfer rolls | 50 to 265 feet/minute; 0.25 to 30" Hg vacuum. |
| Endless belt take-off | 50 to 265 feet/minute. |
| Web separating rolls speed | 1 to 1.67 times take-off speed. |
| Web weakening rolls settings (at 225 feet/minute): | |
|    Bag Length | 24¾"–16¼" |
|    Cycle time (sec.) | 0.550–0.356. |
|    Cam (RPM) | 109.091–166.154. |
|    Index time (sec.) | 0.26971–0.26971. |
|    Dwell time (sec.) | 0.28029–0.08640. |
|    Vacuum range | 0.25 to 30" Hg. |
|    Serrations: | |
|       Spacing, A | 0.030". |
|       Depth, B | 0.002". |
|       Contour, C | 60°. |
|    Web crushing bar: | |
|       Depth, D | 0.08". |
|       Contour, E | 60°. |
| Serrated land/crush bar interference | 0.001 to 0.003". |
| Outer web-weakening roll diameter | 8.98". |
| Clearance, F, between rolls | 0.015 to 0.020" |
| Web strand diameter | .010 to .020". |

From the foregoing description, it can be seen that one of the primary advantages of the process and apparatus of this invention is its precise reproducibility. It forms accurate length net bags with proper registration of the sealing labels at one end while, after web separating into individual lengths, the other end is open for filling by the user.

The apparatus handles unsupported, non-rigid tubular net-like or similar structures and maintains the net in a smooth, natural tension, flat form for continuous, multiple-phase processing.

The machine is capable of accurate centering of the label with respect to the net, producing accurate length bags, maintaining label registration with respect to both net and other label, providing uniform sealing, and providing uniform index-crushing and bursting.

It is to be understood that the foregoing description is by way of example only and that various modifications and changes in the details may be made without departing from the spirit of the invention and the scope of the following claim.

What is claimed is:

1. In a process for fabricating labeled, open-ended bags from tubular thermoplastic netting material comprising spreading and feeding the tubular netting material in a continuous flattened band, applying labels to the tubular netting material, forming transversely weakened lanes across the netting and separating the bag sections at the weakened lanes, the improvement comprising the essentially simultaneous application of labels and formation of the transversely weakened lanes by:

(a) applying two adhesively sealable labels to the external surfaces of the flattened netting at predetermined intervals, (b) adhering one of said labels to the other of said labels through the open netlike structure of the flattened netting by pressing them together, and (c) forming a transversely weakened lane across the netting substantially adjacent to said labels.

References Cited

UNITED STATES PATENTS

| | | | |
|---|---|---|---|
| 3,093,280 | 6/1963 | Simpson et al. | 225—96 |
| 3,017,314 | 1/1962 | Kebekus et al. | 156—498 |
| 2,013,086 | 9/1935 | Baker | 156—510 |
| 3,008,366 | 11/1961 | Taylor | 83—678 |
| 3,297,509 | 1/1967 | Mercer | 156—290 |

EARL M. BERGERT, *Primary Examiner.*

W. E. HOAG, *Assistant Examiner.*

U.S. Cl. X.R.

53—678; 93—58.1; 156—290, 519, 552